Dec. 17, 1957　　A. W. BUCHERER　　2,816,637
FLUID POWER TRANSMISSION
Filed July 31, 1953　　3 Sheets-Sheet 1

ARCHIBALD W. BUCHERER,
INVENTOR.

BY

ATTORNEY.

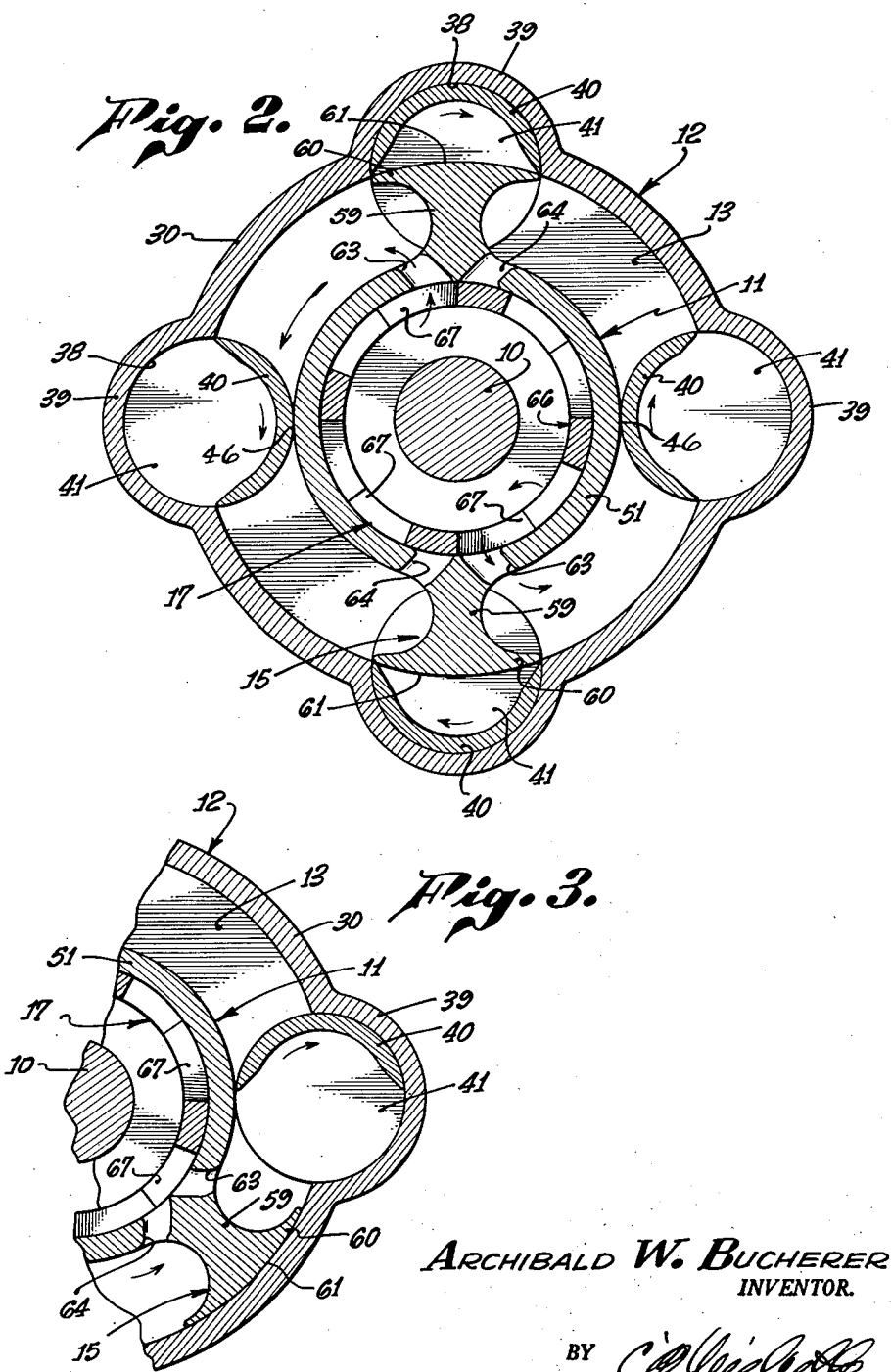

Dec. 17, 1957 A. W. BUCHERER 2,816,637
FLUID POWER TRANSMISSION
Filed July 31, 1953 3 Sheets-Sheet 3
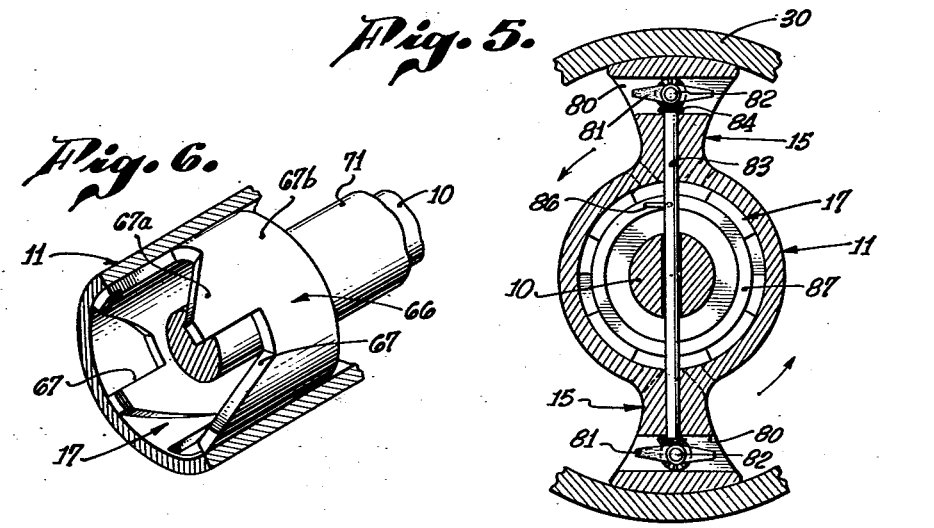
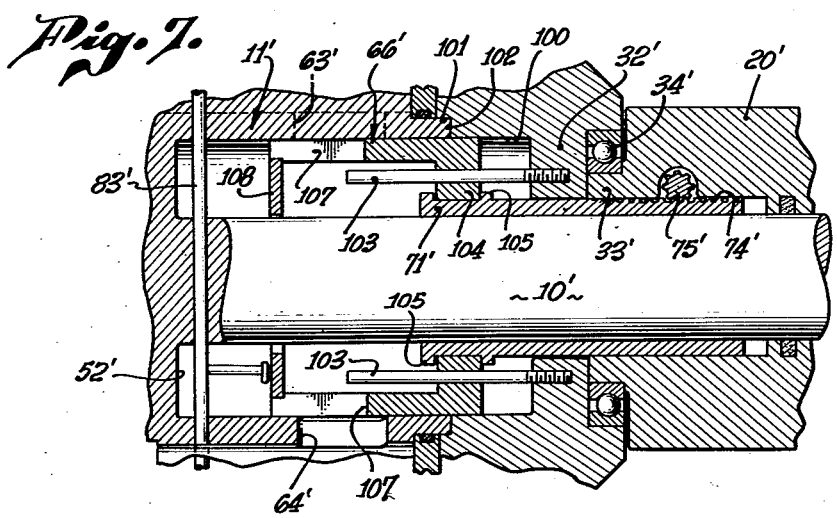
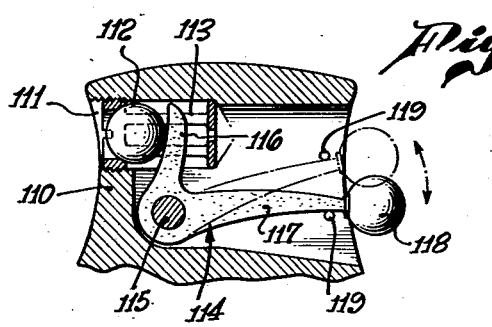
ARCHIBALD W. BUCHERER,
INVENTOR.
BY
ATTORNEY.

United States Patent Office 2,816,637
Patented Dec. 17, 1957

2,816,637

FLUID POWER TRANSMISSION

Archibald W. Bucherer, Los Angeles, Calif.

Application July 31, 1953, Serial No. 371,561

21 Claims. (Cl. 192—58)

This invention relates to power transmission means and more particularly to an improved automatic fluid transmission for use in smoothly transmitting power from a driving means to a driven means and especially for use in vehicles.

Prior fluid transmission means utilized on vehicles have usually included a fluid power transmitting means in association with a mechanical gear means. In operation of such prior fluid transmission means the fluid portion of the drive was primarily utilized for providing smooth transmission of power in lower speed ranges. When the vehicle reached high speed ranges mechanical drive means became effective and the fluid means was made ineffective to transmit power. In other fluid transmission means power was transmitted entirely by the fluid through all speed ranges. However, these latter prior transmission means were inefficient at high speed ranges and therefore were undesirable.

The present invention contemplates a fluid power transmission means wherein the disadvantages of the prior transmission means are obviated and wherein an efficient effective transmission of power through fluid is achieved for virtually all desired speed ranges from low to high.

An object of this invention is to design and provide a novel power transmission means for use on vehicles wherein the transmission of power through fluid means is efficiently accomplished at both low and high speed ranges.

Another object of this invention is to design and provide a fluid power transmission means wherein the change to various speeds is smoothly and automatically accomplished.

A further object of this invention is to design and provide a fluid transmission means which is both hydraulically and dynamically balanced.

A still further object of this invention is to design and provide a fluid transmission means wherein frictional resistance occurring between relatively moving portions of the fluid transmission means is minimized.

The invention contemplates a novel fluid transmission means which has positive power transmitting characteristics which are virtually equivalent to the characteristics of mechanical power transmission.

A still further object of this invention is to design a fluid transmission means wherein automatically operable governor means may be employed for producing smooth and most efficient transmission of power through the various speed ranges.

The invention contemplates a fluid power transmission means wherein a novel arrangement of a driving member and a valve cylinder member cooperable therewith transmits power in the form of incremental impulses to a driven member.

A still further object of this invention is to disclose and provide a modification of a novel fluid power transmission wherein a valve cylinder member provided with openings of serrate-like configuration is mounted for rotation with a driven member and is axially movable with respect to an inner driving member of cylindrical form.

The objects of this invention also include the provision of a valve cylinder member for a fluid power transmission wherein openings of serrate-like form are cooperable with ports of a cylinder-like driving member for varying the opening of said ports so that in one position the valve ports are completely covered to prevent flow between leading and trailing faces of a blade member provided on the driving member and in another position to fully open said valve ports to permit full flow of fluid between the leading and trailing faces of the blade member.

The invention contemplates a modification of valve means carried in the blade member of such a cylindrical driving member which may be particularly utilized with the modification of this invention which includes mounting the valve cylinder for rotation with the driven housing or member.

Generally speaking, this invention contemplates a transmission means wherein an annular chamber for fluid is provided between a virtually cylindrical hollow driven housing and a virtually hollow cylindrical inner driving member concentrically arranged therewith and of smaller diameter. The inner driving member is directly connected to driving means and includes a blade extending into the annular chamber and having slidable engagement with the internal surface of the housing. The housing includes a plurality of circumferential outwardly extending recesses opening into the annular chamber and provided with rotatable semi-cylindrical vanes which are adapted to rollingly contact against the outer surface of the inner member. The vanes are positively driven for rotation during relative movement of the housing and the inner member. Valve ports are provided on the inner driving member on opposite sides of the blade member so that fluid may pass by smooth flow into and out of the hollow inner member, the passage of said fluid being controlled by axially movable valve means within the inner driving member.

Other objects and advantages of this invention will be readily apparent from the following description of the drawings in which an exemplary embodiment of this invention is shown.

In the drawings:

Fig. 2 is a transverse sectional view taken in the plane indicated by line II—II of Fig. 1.

Fig. 3 is a fragmentary sectional view taken in the same plane as Fig. 2 but illustrating a different position of the driving and driven means.

Fig. 5 is a fragmentary transverse sectional view of automatically governed valve ports employed with this invention.

Fig. 6 is a perspective view of a valve cylinder employed with this invention in cooperable relation with an inner driving member.

Fig. 7 is a fragmentary section view illustrating a modification of this invention wherein a valve cylinder is mounted for rotation with an outer driven housing.

Fig. 8 is a fragmentary sectional view taken through a blade member of an inner driving member showing a modification of a valve means for automatically controlling flow of fluid between leading and trailing edges of a blade member.

Figures 1, 4:
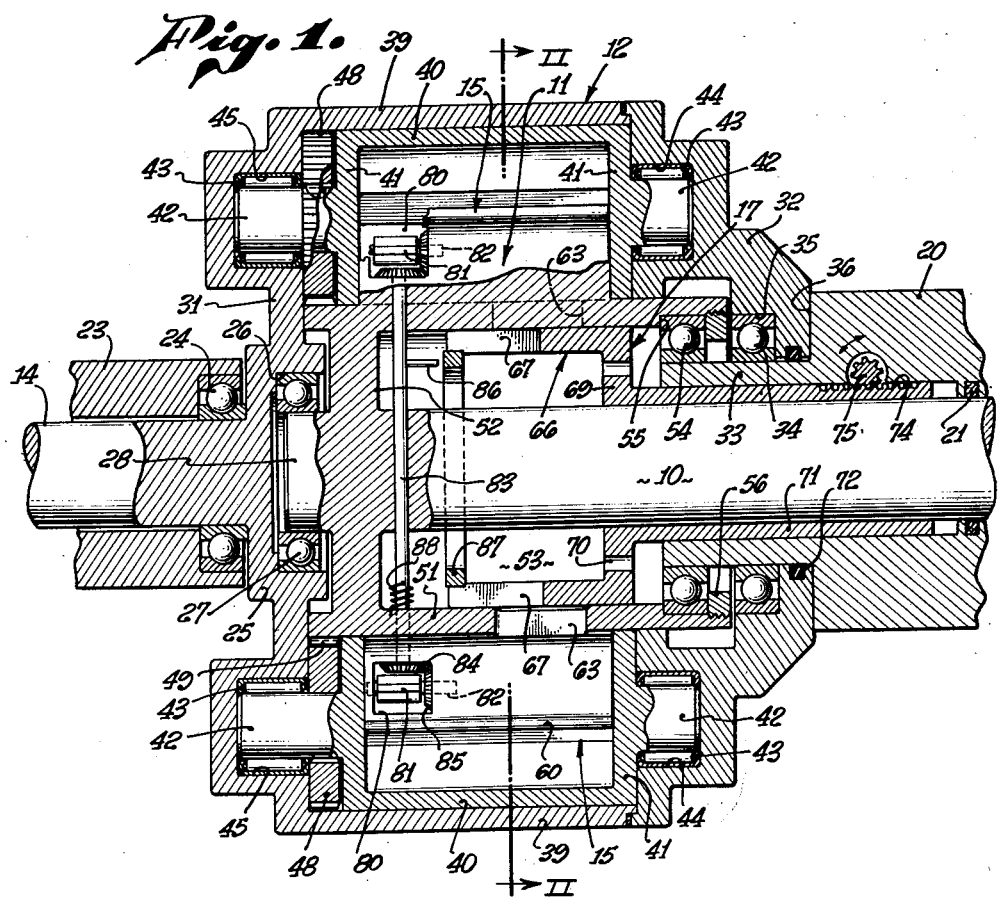
Fig. 1 is an enlarged sectional view of a fluid transmission means embodying this invention, the section being taken in a plane bisecting the transmission means and passing through the axis of the driving and driven shafts.
Fig. 4 is a perspective view of the inner hollow driving member employed in this invention.

In general the fluid power transmitting means embodying this invention as shown in Fig. 1 comprises a driving shaft 10 carrying at one end a cylindrical, hollow, inner driving member 11. Encircling the inner member 11 is an outer relatively rotatable driven housing 12 defining therewith a generally annular power transmitting chamber 13. The outer housing 12 is carried by a driven shaft 14. The inner driving member 11 is provided with driving blade members 15 operable in chamber 13 which may be filled with a suitable fluid such as oil. A cylindrical valve means 17 is carried by the driving shaft 10 within the inner driving member 11 for controlling flow of fluid between the leading and trailing faces of the blades 15.

Means for supporting in coaxial relation the driving shaft 10 and the driven shaft 14 may comprise a support member 20 provided with antifriction bearings (not shown) for mounting the driving shaft 10. A suitable seal 21 such as an O ring may be carried by the support member 20 for preventing passage or leakage of fluid along the driving shaft 10. The driving shaft 10 may be connected in well-known manner to a suitable power means such as an automobile engine.

The driven shaft 14 may be antifrictionally supported in a support member 23 by suitable antifriction bearings 24 such as ball bearings. The driven shaft 14 may carry at its inner end an inwardly facing, cup-shaped, enlarged portion 25 defining a circular recess 26 coaxial with the axis of the driven shaft 14. The recess 26 provides a seat for an antifriction bearing 27 of ball bearing type which may receive end 28 of the driving shaft 10. The driven shaft 14 and driving shaft 10 are thereby accurately mounted in coaxial relation.

The outer housing 12 may comprise a generally cylindrical wall 30 and end walls 31 and 32. End wall 32 may be mounted in convenient manner upon an inwardly extending reduced end portion 33 of the support member 20 by a suitable antifriction bearing 34 seated on said portion 33 and carried within an inwardly facing annular recess 35 formed on end wall 32. The wall 32 may seat against the shoulder on the support member 20 defined by the reduced portion 33 as at 36.

The end wall 31 as illustrated may be formed integrally with the enlarged portion 25 of the end of the driven shaft 14. It is understood that end wall 31 may be separately constructed and mounted on said portion 25 in any suitable well-known manner. Also, end wall 31 is illustrated as being integrally formed with one end of the cylindrical wall 30, and it is understood that the cylindrical wall 30 may be connected to a separate end wall 31 in any convenient well-known manner.

Longitudinally extending, circumferentially spaced vane recesses 38 may be formed in wall 30 by wall portions 39 of generally semicircular outwardly extending configuration. The recesses 38 open inwardly to the annular fluid chamber 13. In the illustration the recesses 38 are shown spaced apart approximately 90°. It is understood that two or more recesses 38 may be employed in order to achieve selected results.

Rotatably received within each recess 38 is an elongated vane element 40 of generally semicircular cross section, the outer surface of each element 40 being slidable on the inner surface of recess 38 when the element 40 is rotated therewithin. The vane element 40 includes integral circular end members 41 which may be provided with integral, axially aligned trunnions 42. The trunnions 42 of each element 40 may be antifrictionally mounted by suitable needle bearings 43 carried within axially aligned bearing pockets 44 and 45 respectively, provided in end walls 32 and 31. Each element 40 is adapted to be entirely received within the recess 38 in one position as shown in Fig. 2, and is adapted to rollingly contact as at 46 the outer surface of the inner driving member 11 during approximately 180° of rotation of the vane element.

Means for rotating each vane element may comprise a planetary gear 48 keyed to the trunnion 42 extending into bearing pocket 45 on end wall 31. Each gear 48 meshes with a main sun gear 49 carried on the adjacent outer end of the inner driving member 11. As the driving member 11 rotates, gears 48 are driven by gear 49 and for each 90° of rotation of the inner driving member, the vane elements 40 are rotated 180°.

The inner hollow cylindrical driving member 11 comprises a cylindrical wall 51 concentric with the cylindrical wall 30 of the outer housing 12, and spaced therefrom to provide the annular chamber 13. The cylindrical wall 51 may be carried by the driving shaft 10 in spaced encircling relation thereto by a radially, outwardly extending, transverse end wall 52 which defines the shaft end portion 28 and which also carries main gear 49. The transverse wall 52 closes one end of a hollow annular chamber 53 formed by the cylindrical wall 51.

The opposite end of cylindrical wall 51 extends over the inner end margin of the reduced portion 33 and is supported thereon by an antifriction bearing 54. The antifriction bearing may be secured against a shoulder 55 by a retainer ring 56 threaded on the inner marginal surface of the wall 51. It will be apparent that the cylindrical wall 51 is thus accurately coaxially mounted with respect to the driving shaft 10 and the cylindrical wall 30.

As best seen in Fig. 4 the inner driving member carries a pair of diametrically opposed, radially outwardly extending blade members 58. Each blade member 58 includes a longitudinally extending web 59 which extends substantially entirely between the inner surfaces of end walls 31 and 32. Each web 59 carries a longitudinally extending head 60 of the same length as web 59 but of greater transverse width so as to present a top curved surface 61 slidable along the inner surface of cylindrical housing wall 30 and having a width sufficiently great to substantially close the opening of vane recesses 38 when the blade 58 is directly opposite thereto.

The inner driving member 11 may be provided with an elongated, axially extending normally leading port 63 and a trailing port 64 at the base of each web 59 and in the portion adjacent to the end wall 32. The ports 63 and 64 are adapted to permit passage of fluid in chamber 13 from the zone forwardly of the leading face of the driving blade member 58 to the zone rearwardly of the trailing face thereof, by permitting fluid to pass into and through the inner hollow driving member 11.

Means for controlling the passage of fluid from the zone forwardly of the blade member to the zone rearwardly thereof may be provided by a valve member 66 of generally cylindrical form having an open end facing wall 52 of the driving member 11 and having an outer cylindrical surface longitudinally slidably engaging the inner cylindrical surface of wall 51 of the inner driving member. The valve member 66 is provided with serrate-like, generally trapezoidal valve openings 67 (Fig. 6) in the end portion of the valve member adjacent to the open end thereof. The length of openings 67 corresponds generally to the length of ports 63 and 64. When the valve member 66 is in its initial retracted position (i. e. to the right of Fig. 1) the ports 63 and 64 may be covered by serrate portion 67a of the valve member. Upon relative rotation of the driving member 11 with respect to the valve member 66 the serrate openings 67 will intermittently fully open the ports 63 and 64 to permit full flow of fluid therethrough. When the valve member 66 is in its opposite fully extended position, the ports 63 and 64 are virtually completely closed by the solid portion 67b of the valve cylinder. When the valve member 66 is axially moved between the above-mentioned two positions, the area of the ports 63 and 64 will be gradually diminished or increased depending upon the direction in which the valve cylinder is axially moved. It is understood that because of relative rotation of the inner driving member 11 with respect to the valve cylinder 66 the variation in area of the ports 63 and 64 occurs intermittently. Thus, the variable openings 67 of the valve member together with the openings of the ports 63 and 64 control in a variably adjustable manner intermittent flow of fluid from the zone forwardly of the blade member to the zone rearwardly thereof. As illustrated in Fig. 6 the flow of fluid is decremental, completely interrupted, and abruptly released through the ports whereby a positive operation of the transmission without fluid slippage is assured even at lowest gear ratios or speed ranges.

Free axial movement of valve member 66 within the inner driving member 11 is permitted by providing transverse wall 69 of the valve member with a plurality of circularly spaced ports 70 of sufficient diameter so that fluid within the inner hollow member may freely flow through wall 69.

The valve member 66 also includes a longitudinally extending tubular sleeve 71 relatively loosely fitted about driving shaft 10 so that when the device is filled with fluid, fluid may flow between the shaft 10 and the internal surface of sleeve 71 providing a loose fluid mounting for the sleeve for axial movement thereof. A seal 72 may be provided between the outboard internal surface of wall 32 and the reduced portion 33 of support 20 to prevent leakage of fluid.

Exemplary means for axially moving valve member 66 may include rack teeth 74 formed on the end of sleeve 71 and meshed with a pinion 75 rotatable about an axis transverse to the axis of shaft 10 and adapted upon rotation to advance or retract valve member 66. The shaft carrying pinion 75 may be connected by suitable means to a suitable control mechanism whereby the valve will be opened as desired in response to motion of an accelerator pedal or other manually operated levers.

Means for further controlling flow of fluid from one side of the blade members 58 to the other side thereof may include a valve port 80 provided in the web 59 of the blade members 15 adjacent to the end of the shaft 10. Each valve port 80 may accommodate a butterfly-type valve member 81 pivoted about a transverse axis 82. One leaf of the butterfly valve 81 may be made of relatively heavier material than the opposite leaf. The response of the heavier leaf to centrifugal force acting against spring pressure is arranged to move the valve 81 into closed position as the inner driving member reaches a predetermined speed.

The valves 81 are connected to simultaneously respond to centrifugal force by means of a shaft 83 which extends transversely through the driving shaft 10 adjacent the end thereof. Each end of shaft 83 may carry a bevel gear 84 which is meshed with a mating bevel gear 85 rotatably carried about the axis 82. The shaft 83 may carry a sidewardly extending arm 86 which is adapted to slidably engage a ring 87 carried by the outer end of the valve member 66. A spring 88 carried by shaft 83 and secured to web 59 biases the shaft so that valves 81 are returned to open position at low speed from all gear positions except the highest at which the valves 81 are prevented from opening by restraining action of ring 87 on arm 86. Automatic idling of the driving member thus achieved makes manual control of the transmission unnecessary in order to bring the driven member to a halt or to commence rotation thereof from a stop position except when in the highest gear. It is also understood that positive closure of valves 81 in high gear not only permits efficient driving of the device in highest gear but also affords utilization of the braking pressure of the motor.

While the valves 81 have been described above as being capable of operation with the valve cylinder 66, it is understood that other means may be employed to manually operate valves 81 for achieving desired fluid transmission of power. It may be desired to control or over-rule the governing effect of these valves by the manually operable means for regulating passage of fluid from one side of the blade member to the other side thereof.

Before discussing operation of the fluid transmission of this invention it should be noted that as the inner driving member is rotated, vane elements 40 are mechanically driven so that they are rotated out of the annular chamber 13 as a blade member approaches. When the blade member is positioned directly opposite a recess 38 the associated vane element is entirely received within said recess.

It should be remembered that in a transmission embodying this invention in which a pair of diametrically opposed blade members are employed the outer housing may be provided with two pairs of diametrically opposed vane elements. When one pair of vane elements is entirely positioned within their respective recesses the other pair of vane elements are fully positioned and extend into the annular chamber.

In operation of the fluid power transmission of this invention the chamber 13, the recesses 38 and the inner chamber within the inner driving member may be completely filled with suitable fluid such as an oil having a preselected viscosity. In low gear or in starting position the valve member 66 is in retracted position (to the right in Fig. 1) so that ports 63 and 64 in the inner driving member are covered by the serrate portion 67a of the valve member 66. As the driving shaft is rotated relative rotative movement occurs between the inner driving member and the stationary valve cylinder so that passage of fluid from a zone forwardly of the blade member to a zone rearwardly of the blade member may occur when the ports 63 and 64 are uncovered. It is particularly important to note that the passing of fluid through the ports 63 and 64 is of an intermittent nature because of the fact that the serrate portion 67a and the serrate opening 67 alternately cover and uncover the ports 63 and 64. The serrate opening 67 in its retracted position is sufficiently wide enough so as to fully open both ports 63 and 64. The intermittent flow of fluid from one side of the blade member to the other thereof causes intermittent pressure to be exerted by the blades against the pair of vane elements 40 located forwardly of the blade members.

As the valve cylinder 66 is axially moved from its utmost retracted position by any suitable means the ports 63 and 64 are successively limited in their area of opening. Thus, the flow of fluid through the ports 63 and 64 as they are alternately opened and closed is further decrementally limited and the ports are closed for longer periods. When the valve member 66 is in fully extended position so that ports 63 and 64 are entirely closed by the cylindrical portion 67b of the cylinder, flow of fluid is stopped through the ports 63 and 64. In such position of the valve member 66 the butterfly valves 81 are also in closed position so that virtually no fluid is passed from one side of the blade to the other. Thus, the inner driving member is now rotating at virtually the same speed as the outer housing.

The intermittent positive power impulses transmitted to the driven housing through the vane elements 40 by reason of the particular arrangement of the inner driven member and the stationary valve cylinder member transmits power in a manner in which slippage due to the fluid characteristics of the transmission means is reduced to a minimum. The incremental power impulses which are delivered at rapid intervals to the driven housing are practically unnoticeable so that a smooth transmission of power is afforded.

When a heavy load is placed on the driven shaft causing deceleration of the driving member the valves 81 tend to open thereby permitting fluid to pass from one side of the blade member to the other and also allow the driving source of power to gain momentum. It may be necessary under such conditions to cause retraction of the valve member 66 so as to provide the necessary transmission of power under such load conditions.

In the embodiment described above it will be noted that the cylindrical valve member 66 is non rotatable and is axially moved so as to control and regulate passage of fluid from one side of the blade to the other. In the example shown in Fig. 7 a modification of the arrangement of the valve member 66 is illustrated in which the valve member is mounted for rotation with the driven member. Thus, relative movement is again provided between the inner driving member and the valve cylinder whereby a more fully automatic transmission of power is afforded.

In Fig. 7 the driving shaft 10' carries an inner driving hollow cylinder member 11' of virtually the same structural characteristics as that of the previous embodiment. The inner hollow driving member 11' encloses a valve cylinder member 66' which may be of serrate form as in the previous embodiment.

The driven housing is only fragmentarily shown and includes as in the prior modification an end wall 32' which may be mounted on the extension 33' by antifriction means 34'. The end wall 32' is provided with an annular recess 100 which is adapted to receive the valve cylinder 66' in its retracted position. The edge margin of the recess 100 may be provided with an inwardly extending relatively shallow lip 101 which is adapted to receive the edge margin 102 of the inner driving member 11'.

Means for rotating the valve cylinder 66' with the driven housing includes a plurality of spaced, longitudinally extending guide rods 103 provided on the end wall 32' and extending from the bottom of the recess 100. The valve cylinder 66' is provided with an annular end wall 104 which is ported at spaced intervals to slidably receive the guide rods 103. The inner periphery of the annular wall 104 extends into proximity with the actuating sleeve 71' which may be provided with radially outwardly extending annular rings or lips 105 for positioning contact with the annular wall 104. A loose fit is provided between the rings 105 to afford free relative rotational movement of the cylinder and sleeve. The valve cylinder 66' is moved into retracted and extended position by the sleeve 71' actuated in a manner similar to that described in the prior embodiment.

The valve cylinder 66' is provided with a serrate portion 107 formed in a manner similar to the valve cylinder 66 of the prior embodiment. If desired, the end of valve cylinder 66' opposite to the end wall 104 may be supported for slidable axial movement with respect to the shaft 10' by means of a spider or spacing member 108.

It will be readily apparent that upon rotation of the driving shaft 10' and the inner member 11' the ports 63 and 64 will be opened and closed in a manner different from that described in the prior embodiment because of the rotation of the valve cylinder with the driven housing. In retracted position the serrate openings of the valve cylinder 66' will intermittently open and close the ports 63' and 64'. However, in extended position of the valve cylinder 66' the solid portion of the valve cylinder will completely close said ports during rotation. Since no fluid is permitted to pass from one side of the blade member to the other side under such conditions, it is has been found desirable to provide a secondary auxiliary port and valve therefor in the web of the blade member.

In Fig. 8 such a valve and port is illustrated. The web 110 of the blade member may be of thicker section than that described in the prior embodiment. The web 110 is provided with a port 111 which may be closed by a spherical ball element 112. The inner margins of the port 111 may be concave to correspond to the configuration of the ball 112. The ball is guided for its movement away from the port 111 by a plurality of spaced guide members 113, said guide members being turned inwardly toward each other at one end. The guide members 113 may be secured to the web 110 in any well-known manner.

Means responsive to centrifugal force for controlling the opening and closing of the port 111 by the ball element 112 may include a lever means 114 pivoted at 115 in the web 110. The lever means 114 includes an upstanding arm 116 which extends into the cage formed by the guide members 113 for contact with the rear portion of the ball element 112. An arm 117 extends at generally right angles to the arm 116 and carries at its end a weighted mass 118. Movement of the lever means 114 about the pivotal axis 115 may be limited by spaced pins 119 adapted to contact the arm 117. The arm 117 is preferably made of a resilient flexible material.

The second auxiliary valve means shown in Fig. 8 when used in combination with the rotatable valve cylinder shown in Fig. 7 provides an automatic response to changes in speed of rotation of the transmission. Normally the ball element 112 is held against the valve seat at the port 111 by the resilient arm 117 of the lever means 114. When fluid pressure in the annular chamber between the driven member and the driving member increases by an increase in speed of rotation of the driving member, the ball element 112 will be displaced from its seat by the fluid pressure overcoming the spring pressure of the resilient lever 117. Additional flow of fluid through the secondary valve means will produce an increased rotational speed of the driving member and thereby creates an increase in centrifugal force acting upon the mass 118 which tends to move the ball element 112 into closed position with respect to port 111.

It should be noted that fluid passes from one side of the blade to the other or trailing side by flowing through suitable ports into the hollow chambers provided in the inner driving member and valve cylinder. The invention contemplates flow of fluid in paths outwardly of the inner driving member so as to bypass certain of the vane elements and to move from one side of the blade member to the other.

In the embodiments of this invention described above it will be noted that there is provided a fluid power transmission in which fluid is employed in a novel manner for producing transmission of power efficiently from low to high speed ranges. The power is transmitted with a minimum of loss of energy due to slippage of driving and driven members in the fluid because of the intermittent power pulsations which are developed by the particular arrangement of the valve cylinder and the inner driving member.

It will be readily understood by those skilled in the art that while the above-described fluid power transmission means has been illustrated for transmitting power from a driving to a driven means the transmission means may also be employed with slight modification as a fluid brake.

It is understood that various changes and modifications may be made in the fluid power transmission means above described, and all such changes and modifications coming within the scope of the appended claims are embraced thereby.

I claim:

1. In a fluid power transmission, the combination of: a driven shaft and a driving shaft; support means for said shafts for axially aligning said shafts; a hollow housing carried by said support means and comprising a cylindrical wall and end walls therefor; one of said end walls being carried by the driven shaft and the other of said end walls being carried by one of said support means; longitudinally extending, circumferentially spaced, inwardly opening, semi-circular section compartments formed on said cylindrical wall; inwardly facing recesses formed on said end walls in alignment with said compartments; a hollow, semi-cylindrical vane member in each compartment and provided with oppositely directed trunnions received within said recesses; anti-friction means in said recesses for mounting said trunnions; a hollow, generally cylindrical inner member concentric with the driving shaft and including an end wall adjacent to one of the end walls of the housing; anti-friction means supporting the opposite end of said cylindrical member from one of said support means; diametrically opposite blade means carried by the cylindrical member and slidably engaged with internal cylindrical surface portions of the housing; each blade member having a top curved end portion adapted to extend across the inner face of a compartment adjacent to the bases of said blades and on opposite sides thereof; a pair of ports in said inner cylindrical member adjacent to the base of each blade; a cylindrical valve member within the inner, hollow, cylindrical member provided with a serrated, marginal edge adapted to close one of said ports in controllably, varying relation; said valve member including an elongated sleeve loosely slidably fitted over said driving shaft; gear means carried by the inner, hollow member in engagement with gears carried by the vane members for rotating said vane members; and means for adjustably sliding said valve member along said driving shaft.

2. In a fluid power transmission, the combination of: a driven shaft and a driving shaft; support means for said shafts for axially aligning said shafts; a hollow housing carried by said support means and comprising a cylindrical wall and end walls therefor; one of said end walls being carried by the driven shaft and the other of said end walls being carried by one of said support means; longitudinally extending, circumferentially spaced, inwardly opening, semi-circular section compartments formed on said cylindrical wall; a hollow, semi-cylindrical vane member in each compartment; a hollow, generally cylindrical inner member concentric with the driving shaft and including an end wall adjacent to one of the end walls of the housing; diametrically opposite blade means carried by the cylindrical member and slidably engaged with internal cylindrical surface portions of the housing; each blade member having a top curved end portion adapted to extend across the inner face of a compartment adjacent to the bases of said blades and on opposite sides thereof; said inner member being provided with a port adjacent each blade; a cylindrical valve member within the inner, hollow, cylindrical member provided with a serrated, marginal edge adapted to close one of said ports in controllably, varying relation; gear means carried by the inner, hollow member in engagement with gears carried by the vane members for rotating said vane members; and means for adjustably sliding said valve member along said driving shaft.

3. In a fluid power transmission, the combination of: a driven shaft and a driving shaft; support means for said shafts for axially aligning said shafts; a hollow housing carried by said support means and comprising a cylindrical wall and end walls therefor; one of said end walls being carried by the driven shaft and the other of said end walls being carried by one of said support means; longitudinally extending, circumferentially spaced, inwardly opening, semi-circular section compartments formed on said cylindrical wall; a hollow, semi-cylindrical vane member in each compartment; a hollow, generally cylindrical inner member concentric with the driving shaft and including an end wall adjacent to one of the end walls of the housing; diametrically opposite blade means carried by the cylindrical member and slidably engaged with internal cylindrical surface portions of the housing; each blade member having a top curved end portion adapted to extend across the inner face of a compartment adjacent to the bases of said blades and on opposite sides thereof; said inner member being provided with ports adjacent each blade member; a cylindrical valve member within the inner, hollow cylindrical member provided with a serrated, marginal edge adapted to close one of said ports in controllably, varying relation; and means for adjustably sliding said valve member along said driving shaft.

4. In a fluid power transmission, the combination of: a driving means and a driven means in coaxial relation; said driven means including a hollow housing provided with a plurality of spaced inwardly facing semi-circular section compartments; a vane member of semi-circular section rotatably driven in each compartment; means connecting the driving means and the vane member for driving said vane member; said driving means comprising an inner hollow cylindrical member defining with the housing an annular chamber for fluid, said inner member including diametrically opposed blade members operable in said annular chamber; valve ports in said inner member on opposite sides of each blade member; and means on the driving means for regulating the opening of said ports; each vane member being rotatable into a compartment in one position of a blade member and out of said compartment into said chamber in a different rotatable position of said blade member.

5. A transmission as claimed in claim 4 wherein the means for regulating the opening of said ports includes a valve cylinder member coaxial with the inner hollow driving member and axially slidable therewithin.

6. A transmission as claimed in claim 5 wherein auxiliary valve means are provided in said blade member for controlling flow of fluid from one side thereof to the other side thereof.

7. A transmission as claimed in claim 6 wherein means on the valve cylinder member and means connected to the auxiliary valve means cooperably interengage for controlling flow of fluid in said chamber.

8. In a fluid power transmission, the combination of: a driving means having a cylindrical wall provided with an outwardly extending blade member and defining an internal chamber; said wall being provided with ports therein on opposite sides of the blade member; a driven means including a hollow housing enclosing said cylindrical wall and providing therewith an annular chamber for fluid; said housing having an inwardly facing longitudinally elongated recess; a rotatable vane member of semi-circular cross-section carried by said housing in said recess and adapted to be positioned entirely within said recess when the blade member passes said recess and to rollingly contact said cylindrical wall in other positions of the blade member; means connecting the driving means and the vane member to position the vane member in timed relation to movement of the blade member; and valve means for said ports carried beneath the cylindrical wall in said internal chamber and adjustably movable to control flow of fluid through said ports between said annular chamber and said internal chamber.

9. A transmission as claimed in claim 8 wherein said blade member is provided with a port and a valve element is pivotally mounted at said port for controlling flow of fluid from one side of the blade member to the other side thereof.

10. A transmission as claimed in claim 8 wherein said valve means comprises a cylindrical valve member having spaced openings of varying area therein.

11. A transmission as claimed in claim 8 wherein means cooperably engage said driving means and said vane member for rotating said vane member in correlation with said blade member.

12. In a fluid power transmission the combination of: a driving means having a cylindrical wall provided with an outwardly extending blade member; said wall being provided with ports adjacent leading and trailing faces of said blade member; a driven means including a hollow housing enclosing said cylindrical wall and providing therewith an annular chamber for fluid; said housing having a pair of oppositely arranged, inwardly facing, longitudinally extending recesses; a rotatable vane member of semicircular cross-section carried by said housing in each recess and adapted to be positioned entirely within said recess when the blade member passes said recess and to extend into said annular chamber in other positions of the blade member; means connecting the driving means and the vane member for positioning the vane member in timed relation to movement of the blade member; valve means inwardly of the cylindrical wall for said ports including spaced valve openings of varying area cooperable therewith, said valve means and said driving means being relatively movable in a rotational sense whereby said ports are intermittently opened and closed for imparting incremental pulsations of power to said vane members and to the driven housing; and means for axially moving the valve means for controlling flow of fluid through said ports.

13. A transmission as claimed in claim 12 wherein the valve means is non-rotatably mounted with respect to the driven and driving means.

14. A transmission as claimed in claim 12 wherein the valve means is mounted on the housing for rotation therewith.

15. A transmission as claimed in claim 12 wherein auxiliary valve means are provided in the blade member and carried thereby, said auxiliary valve means being responsive to centrifugal force for controlling flow of fluid from one side of the blade member to the other side thereof.

16. In a fluid power transmission, the combination of: a driving means including a cylindrical external surface and an internal chamber; a driven means including a hollow housing enclosing said cylindrical external surface and defining therewith an annular chamber; said driving means being provided with ports for flow of fluid between said internal chamber and said annular chamber; said driving means including a blade member between said ports and extending to internal surfaces of said housing for sliding contact therewith; said housing having an inwardly facing longitudinal recess; a vane member of curvilinear section rotatable in said recess and adapted in one position to be entirely within said recess and in other positions to contact said cylindrical external surface on the driving means; means for rotating said vane member in timed relation with said driving means; and valve means in said internal chamber for said ports adjustably movable to control flow of fluid between said annular chamber and said internal chamber.

17. A transmission as claimed in claim 16 wherein said ports are located adjacent to said blade member.

18. A transmission as claimed in claim 16 wherein a port is located adjacent to said blade member and on each side of said blade member.

19. A transmission as claimed in claim 16 wherein said blade member includes a top curved surface having a width to close the opening to said longitudinal recess in said driven means.

20. A transmission as claimed in claim 16 wherein said blade member is provided with a valved port therein.

21. In a fluid power transmission, the combination of: a driving means including a cylindrical external surface and an internal chamber; a driven means including a hollow housing enclosing said cylindrical external surface and defining therewith an annular chamber; said driving means being provided with a plurality of ports for flow of fluid between said internal chamber and said annular chamber; said driving means including a plurality of blade members between said ports and extending to internal surfaces of said housing for sliding contact therewith; said housing having a plurality of inwardly facing longitudinal recesses; vane members of curvilinear section rotatable in said recesses and adapted in one position to be entirely within said recesses and in other positions to contact said cylindrical external surface on the driving means; means for rotating said vane members in timed relation with said driving means; and valve means in said internal chamber for said ports adjustably movable to control flow of fluid between said annular chamber and said internal chamber.

References Cited in the file of this patent
UNITED STATES PATENTS

| | | |
|---|---|---|
| 1,231,160 | Hungerford | June 26, 1917 |
| 1,507,369 | Escott | Sept. 2, 1924 |
| 1,516,005 | Farrell, Jr. | Nov. 18, 1924 |
| 2,175,970 | Perkins | Oct. 10, 1939 |
| 2,200,157 | Christlein | May 7, 1940 |
| 2,406,548 | Landrum | Aug. 27, 1946 |

FOREIGN PATENTS

| | | |
|---|---|---|
| 496,112 | Germany | Apr. 17, 1930 |